(12) United States Patent
Kienzle et al.

(10) Patent No.: US 7,804,446 B2
(45) Date of Patent: Sep. 28, 2010

(54) ANTENNA FOR A FILL LEVEL RADAR FOR APPLICATIONS INVOLVING HIGH TEMPERATURES AND/OR HIGH PRESSURES

(75) Inventors: Klaus Kienzle, Zell (DE); Josef Fehrenbach, Haslach (DE); Thomas Deck, Wolfach (DE); Daniel Schultheiss, Hornberg (DE); Jürgen Motzer, Gengenbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 12/105,564

(22) Filed: Apr. 18, 2008

(65) Prior Publication Data
US 2008/0303710 A1 Dec. 11, 2008

Related U.S. Application Data

(60) Provisional application No. 60/942,273, filed on Jun. 6, 2007.

(30) Foreign Application Priority Data
Jun. 6, 2007 (DE) .................. 10 2007 026 389

(51) Int. Cl.
*G01S 13/08* (2006.01)
*G01S 7/02* (2006.01)
*G01F 23/284* (2006.01)
*H01Q 1/00* (2006.01)
*G01S 13/00* (2006.01)

(52) U.S. Cl. .................. 342/124; 342/1; 342/4; 342/118; 342/175; 343/700 R; 343/703; 343/841; 73/290 R; 324/600; 324/629; 324/637; 324/642; 324/644

(58) Field of Classification Search ............... 342/1–11, 342/118, 123, 124, 175; 73/290 R, 304 R, 73/304 C, 290 B, 290 V; 324/300–303, 600, 324/629, 637–646; 310/300, 311, 326, 327; 343/700 R, 720, 793, 872, 873, 904–916, 343/703, 841
See application file for complete search history.

(56) References Cited

U.S. PATENT DOCUMENTS

| | | | | | |
|---|---|---|---|---|---|
| 3,701,518 | A | * | 10/1972 | Herff | 342/124 |
| 3,821,834 | A | * | 7/1974 | McElroy | 310/327 |
| 4,254,482 | A | * | 3/1981 | Newman | 342/124 |
| 4,359,902 | A | * | 11/1982 | Lawless | 73/290 R |
| 5,055,788 | A | * | 10/1991 | Kleinberg et al. | 324/303 |
| 5,304,750 | A | | 4/1994 | Schubert et al. | |
| 5,305,237 | A | * | 4/1994 | Dalrymple et al. | 342/124 |
| 5,365,178 | A | * | 11/1994 | Van Der Pol | 342/124 |
| 5,594,449 | A | | 1/1997 | Otto | |
| 5,872,494 | A | * | 2/1999 | Palan et al. | 342/124 |

(Continued)

FOREIGN PATENT DOCUMENTS

DE 3818114 11/1989

(Continued)

*Primary Examiner*—Bernarr E Gregory
(74) *Attorney, Agent, or Firm*—Fay Kaplun & Marcin, LLP (57) ABSTRACT

An antenna for a fill level radar includes a high-temperature process separation device and an attenuation element. The attenuation element is used to improve the measuring signal in the near zone of the antenna and is affixed to the process separation device or in the process separation device. In this way antenna ringing may be significantly reduced.

22 Claims, 5 Drawing Sheets

U.S. PATENT DOCUMENTS

| | | | |
|---|---|---|---|
| 6,137,438 A * | 10/2000 | McEwan | 342/118 |
| 6,276,199 B1 | 8/2001 | Eckert et al. | |
| 6,672,155 B2 * | 1/2004 | Muller et al. | 73/290 V |
| 6,677,891 B2 * | 1/2004 | Fehrenbach et al. | 342/124 |
| 6,727,845 B2 * | 4/2004 | Burger | 342/124 |
| 7,106,247 B2 * | 9/2006 | Edvardsson | 342/124 |
| 7,239,267 B2 * | 7/2007 | Edvardsson | 342/124 |
| 7,388,554 B2 * | 6/2008 | Askildsen et al. | 343/793 |
| 2002/0053238 A1 | 5/2002 | Fahrenbach et al. | |
| 2005/0083228 A1 * | 4/2005 | Edvardsson | 342/124 |
| 2006/0071848 A1 * | 4/2006 | Edvardsson | 342/124 |
| 2006/0267855 A1 * | 11/2006 | Askildsen et al. | 343/793 |

FOREIGN PATENT DOCUMENTS

| | | |
|---|---|---|
| DE | 4336494 | 4/1995 |
| DE | 02/42793 | 5/2002 |
| GB | 1064130 | 4/1967 |
| WO | 2006/038861 | 4/2006 |
| WO | 2006/120124 | 11/2006 |
| WO | 2007/042324 | 4/2007 |

* cited by examiner

ANTENNA FOR A FILL LEVEL RADAR FOR APPLICATIONS INVOLVING HIGH TEMPERATURES AND/OR HIGH PRESSURES

REFERENCE TO RELATED APPLICATIONS

This application claims the benefit of the filing date of DE Patent Application Serial No. 10 2007 026 389.0 filed 6 Jun. 2007 and of U.S. Provisional Patent Application Ser. No. 60/942,273 filed on 6 Jun. 2007, the disclosure of which applications is hereby incorporated herein by reference.

FIELD OF INVENTION

The present invention relates to fill level measuring. In particular, the present invention relates to an antenna for a fill level radar for measuring the fill level in a tank, to a fill level radar comprising an antenna, and to the use of an antenna for fill level measuring.

TECHNOLOGICAL BACKGROUND

With the use of ceramic antenna systems, so-called ringing in the near zone of the antenna system occurs in the C-band (6.3 GHz). This ringing is due to slowly decaying ripples after antenna coupling in the direction of the time axis or distance axis. In the C-band this ringing is relatively pronounced. However, such ringing is also experienced in the so-called K-band (26 GHz) or at higher or lower frequencies.

The increased ringing is system-related and is primarily caused by the transition of air to ceramic material. At these transition points (ceramic material-air or air-ceramic material) a part of the electromagnetic waves is reflected as a result of the large discontinuity in the dielectric constant (dielectric permittivity). From the part that enters the ceramic material, a part is again reflected at the next transition etc. Since the ceramic material provides only little attenuation, it takes a relatively long time until the waves in the system have "fizzled out". This effect manifests itself in the so-called antenna ringing.

In applications at temperatures exceeding 200° C., or in applications involving high pressure, it may not be possible to use an antenna system comprising a process separation device made of polytetrafluoroethylene (PTFE) as is otherwise common, because said process separation device made of PTFE would be destroyed by the high temperature or the high pressure. In such applications, according to the present state of the art, process separation is implemented on a ceramic basis (e.g. aluminium oxide ($Al_2O_3$) with a dielectric permittivity value of approx. 9.9), which may result in significantly more pronounced ringing in the near zone. In this case the term "near zone" refers to a distance of up to 10 m, depending on the antenna system and the frequency used.

As a result of the strong ringing, in many applications near-zone measuring is either not possible or insufficiently accurate. In the case of media involving low dielectric permittivity a measurement is often not possible.

Since this increased antenna ringing is to a large extent construction-related and may thus not be avoidable, it has to be "attenuated" by corresponding measures.

SUMMARY OF THE INVENTION

The present invention relates to an antenna, a fill level radar and the use of an antenna.

The exemplary embodiments, described below, of the antenna equally apply to the fill level radar and to the use of the antenna for fill level measuring.

According to an exemplary embodiment of the present invention, an antenna for a fill level radar for measuring the fill level in a tank is stated, wherein the antenna comprises a process separation device for at least one of high-temperature applications and high-pressure applications, and an attenuation element for improving a measuring signal in the near zone of the antenna, wherein the attenuation element is affixed to, or arranged in, the process separation device.

This may provide for an improved measuring signal in the near zone of the antenna.

According to a further exemplary embodiment of the present invention, the process separation device is designed on a ceramic basis.

According to a further exemplary embodiment of the present invention, the process separation device comprises aluminium oxide ($Al_2O_3$). For example, the process separation device is completely made from aluminium oxide.

By optimising the ceramic antenna system by applying or putting into place attenuation material, ringing may be reduced to the level of the well-functioning PTFE coupling. While in this arrangement the valid echo may also be reduced somewhat (depending on the design by approx. 5 to 10 decibels) the ratio of unwanted signal to wanted signal in the near zone may be improved by up to 40 decibels.

This process may be explained as follows:

The wanted signal, i.e. the signal that is sent from the antenna system and is then received again, passes precisely twice through the system: once in forward direction during transmitting, and once in reverse direction during receiving. The wanted signal thus only passes twice through the installed attenuation material and consequently undergoes only little attenuation.

The component of the wanted signal, which component remains within the antenna system as a result of the reflections at the locations of interference within the antenna system, is in the following denoted as the unwanted signal. This unwanted signal, which causes ringing, passes through the system several times because of the ongoing reflections. Each time the unwanted signal passes the attenuation material it is reduced until it has virtually petered out in said attenuation material. By means of the affixed or integrated attenuation material, this petering-out process is thus significantly accelerated. After only a few passes the unwanted signal can thus essentially be "attenuated out".

This may result in the unwanted ripples decaying significantly more quickly downstream of the antenna coupling.

In this way the measuring signal in the near zone of the antenna may be improved in that the unwanted ringing in the near zone of the antenna system is significantly reduced. In particular in the case of antenna systems for high-temperature applications and/or high-pressure applications (400° C., 160 bar) with a process separation device made of ceramic material, the unwanted ringing in the near zone may be significantly reduced, by placement of the attenuation element according to the invention, to such an extent that in some cases sensitive measuring in the near zone may only now become possible.

According to a further exemplary embodiment of the present invention, the process separation device encloses the attenuation element at least in part.

According to a further exemplary embodiment of the present invention, the attenuation element is designed as an encasing of the process separation device.

The above need not be a complete encasing. Instead, it may be possible to encase only individual regions of the process separation device.

According to a further exemplary embodiment of the present invention, the process separation device comprises a cylindrical region in which the attenuation element is arranged in the cylindrical region of the process separation device.

According to a further exemplary embodiment of the present invention, the process separation device comprises a conical region, wherein the attenuation element is arranged in the conical region.

For example, either the conical region or the cylindrical region of the process separation device are thus completely or partly encased. For example, it may also be possible for part of the conical region to be encased, and at the same time for part of the cylindrical region to be encased. It may also be possible for the entire conical region and part of the cylindrical region to be encased, or vice versa.

The encasing is, for example, designed in the form of a coating.

According to a further exemplary embodiment of the present invention, the tank, whose fill level is to be measured, comprises an interior region, wherein the process separation device comprises a first transition region to the atmosphere on the side (or end) of the process separation device that points towards the interior region of the tank. The attenuation element is arranged in this transition region.

In other words, the attenuation element is located on the end of the antenna, which end in the installed state points towards the interior of the tank or the interior of the container or in the direction of the feed material.

According to a further exemplary embodiment of the present invention, the tank comprises an exterior region, wherein the process separation device comprises a second transition region to an atmosphere on the side (or end) of the process separation device, which side (or end) points towards the exterior region of the tank. In this arrangement the attenuation element is arranged in this second transition region.

In other words, part of the attenuation element or the entire attenuation element is arranged on the end of the antenna, which end is connected to the source of radiation and to the electronics. According to a further exemplary embodiment of the present invention, the process separation device comprises a first region and a second region that is divided off or separated from the first region. In this arrangement the attenuation element is arranged between the two regions.

For example, the attenuation element is arranged in the form of a disc that is inserted between the two regions of the process separation device.

According to a further exemplary embodiment of the present invention, the first region comprises a hole, e.g. a bore hole, in which the attenuation element is arranged, or in which it has been embedded.

For example, the attenuation element can be poured into or slid into the hole.

According to a further exemplary embodiment of the present invention, the attenuation element comprises a carbon material as an attenuation material.

For example, the carbon material is E-RAM-TCG.

E-RAM-TCG is a textile fabric made of carbon, which textile fabric is free of any metals and chemicals, which absorbs microwaves in a wide frequency spectrum while at the same time providing good shielding attenuation. E-RAM-TCG is used, among other things, in the production of protective clothing and work clothing, as well as for shielding rooms from electromagnetic radiation in domestic and industrial environments. The material is non-combustible. Furthermore, the fabric has good breathing properties, can be folded and kinked, and may be embedded in concrete or put in place in dry construction.

The mechanical properties may be as follows:

Weight: 330 $g/m^2$; density: 0.08 g/ccm; resistance to tearing: 981 N/5 cm (warp) and 343 N/5 cm (weft); carbon content: 99.9%; thickness (standard): 0.5 mm; temperature resistance in oxygen as the medium 1000° C.; temperature resistance in the vacuum 3200° C.

According to a further exemplary embodiment of the present invention, the carbon material is reinforced or protected, at least in some sections, by treatment with a high-temperature adhesive or with a sodium silicate solution.

Moreover, at least in some sections, for reinforcement and to provide protection to the carbon material, potassium silicates or their viscous aqueous solutions can be used. Generally speaking these are called water glass (sodium water glass or potassium water glass). In its pure state water glass is a transparent substance, either colourless or, as a result of traces of iron, coloured bluish to greenish or yellowish to brownish, which substance in the presence of water at elevated temperatures and pressures forms colloidal, clear solutions that react in a strongly alkaline manner.

The high-temperature adhesive may be a chemically curing high-temperature adhesive that is thermoconducting, resistant to temperature shocks, electrically insulating, resistant to oils, solvents and most acids, and provides adhesion to practically all clean surfaces. Examples of this are the product Omegabond 600 or Omegabond 700 (single component) or the two-component high-temperature adhesive CC made by the company Newport Electronics GmbH.

In this way it may be possible, for example, to prevent the carbon fabric from coming apart (fanning out) after being cut to size.

According to a further exemplary embodiment of the present invention, the carbon material is, at least in sections, strengthened or protected by treatment involving a cement.

The cement is, for example, a high-temperature cement that absorbs radar waves. This cement is temperature-resistant to temperatures exceeding 1000° C., and may be, for example, available under the product designation C-RAM 325 from the Cuming Microwave Corporation.

It may also be possible to "cage" the carbon material by means of a cage, for example made of metal, and to fix it to the process separation device.

According to a further exemplary embodiment, the carbon material is not a woven fabric but instead a solid material.

In this application, for example carbon fibre reinforced plastic (CFRP) may be considered. With this material, it must in particular be ensured that it is temperature-stable. This in turn may depend on the resin that has been used. When cured with phenolic resin, the material may be used at temperatures of up to 350° C. (By comparison, if the carbon fibre is fixed with epoxy resin, the use may be restricted to 140° C.; in the case of cyanester to 280° C.).

Carbon fibre reinforced carbon (CFC) is also possible as a solid material. This fibre-reinforced carbon material is a composite material that comprises 100% carbon. The application temperature of this material exceeds 1000° C.

According to a further exemplary embodiment of the present invention, the attenuation element comprises a magnetic absorber as an attenuation material.

The above is, for example, a thin ferrite disc.

According to a further exemplary embodiment of the present invention, the magnetic absorber comprises lithium-titanium-zinc-ferrite, nickel-chromium-zinc-ferrite, or aluminium-holmium-ferrite.

These materials have a particular feature in that they largely retain their magnetic properties even at high temperatures of approximately 400° C.

The use of corresponding other materials may also be possible.

According to a further exemplary embodiment of the present invention, the antenna is designed for application at frequencies of 6.3 GHz (C-band) or 26 GHz (K-band).

According to a further exemplary embodiment of the present invention, the antenna is designed for application at frequencies exceeding 26 GHz.

According to a further exemplary embodiment of the present invention, the antenna is designed for application at temperatures exceeding 400° C.

Furthermore, according to an exemplary embodiment of the present invention, a fill level radar with an antenna described above is stated.

According to a further exemplary embodiment of the present invention, the use of a described antenna for fill level measuring is stated.

Below, exemplary embodiments of the present invention are described with reference to the figures.

DETAILED DESCRIPTION OF EXEMPLARY EMBODIMENTS

The illustrations in the figures are diagrammatic and not to scale.

In the following description of the figures the same reference characters are used for identical or similar elements.

Figure 1:
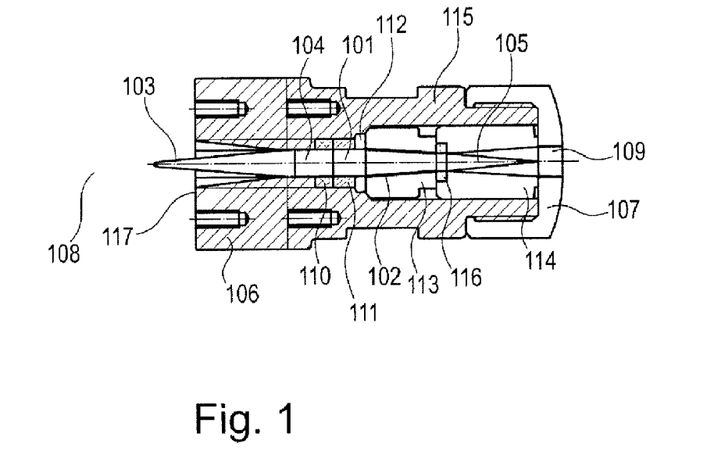
FIG. 1 shows a diagrammatic cross-sectional view of a partial region of an antenna according to an exemplary embodiment of the present invention.

FIG. 1 shows a diagrammatic cross-sectional view of a partial region of an antenna, in which view the process separation device 101 (e.g. made from a ceramic material) is partly enclosed with attenuation material (or with the attenuation element) 102.

In this arrangement the process separation device 101 comprises a first conical region 103, which when the antenna is installed in the tank points towards the interior of the tank or in the direction of the feed material.

The interior of the tank comprises reference characters 108. The antenna horn (not shown in FIGS. 1 to 10) follows on from the region 117.

Furthermore, the process separation device 101 comprises a second conical region 105 which when the antenna is installed points in the direction of the hollow conductor 109 or of the exterior region of the container. Between the two conical regions 103, 105 a cylindrical region 104 is provided which provides a seal (process separation) between the interior of the container and the exterior of the container in conjunction with the cheeks or rings 1110, 111, 112, 116.

The ceramic material 101, 103, 105 is altogether embedded in the antenna body 106, 107, 113, 114, 115.

The element 115 is a hollow conductor part to which the entire other parts are installed or built on. The hollow conductor part 115 together with these entire parts comprises the HF coupling.

The element 106 is used to adapt the ceramic hollow conductor to the antenna horn. Said element 106 is, for example, designed in one part with the hollow conductor part 115. However, said element 106 may also be made in two parts.

The element 110 is a graphite seal that is pressed. The element 111 is a Vacon ring that is soldered onto the ceramic part.

Furthermore, an anti-rotation device 112 is provided to prevent the ceramic part from rotating during the pressing action. In the present example the anti-rotation device 112 is, for example, designed as a so-called cloverleaf disc.

Further provided are a pressure screw 113, a HL adaptor 114 from the ceramic hollow conductor to the air hollow conductor, and a graphite seal 116 in order to provide a gapless transition to the air hollow conductor.

Furthermore, an attenuation element 102 is provided, which encloses the ceramic material in the rear conical region 105 in a layer-like manner. In this variant the ceramic material in the rear conical region (towards the hollow conductor 109) is not metallised.

The attenuation material used may also be used at temperatures around 400° C. or higher. Conventional attenuation material may in most cases be used only at temperatures up to approximately 200° C. because it is incorporated in epoxy resin or silicon.

In one exemplary embodiment a woven carbon fabric with the designation E-RAM-TCG is used as an attenuation material. The attenuation material is, for example, designed as a hose, 8 mm in thickness, which encloses the ceramic material (process separation) in part like a sock or a sleeve. Furthermore, the use of a flat woven material is possible.

Since the fibres of the carbon fabric tend to come apart (fan out) immediately after being cut off, they are strengthened before they are cut off. This takes place, for example, by means of a high-temperature adhesive. The use of sodium water glass (sodium silicate solution) provides another option. Furthermore, it may also be possible to lock the carbon fabric into a type of cage, for example made of metal.

Among other things the position of the carbon material and the ceramic material may be decisive to the function of the antenna according to the invention. The rear conical region 105 and if applicable part of the cylindrical region 104 have proven to be the most favourable position for arranging the attenuation material.

In this way attenuation of ringing by up to 40 decibels may be achieved while the valid echo may be reduced only in the region around 5 to 10 decibels.

Figure 2:
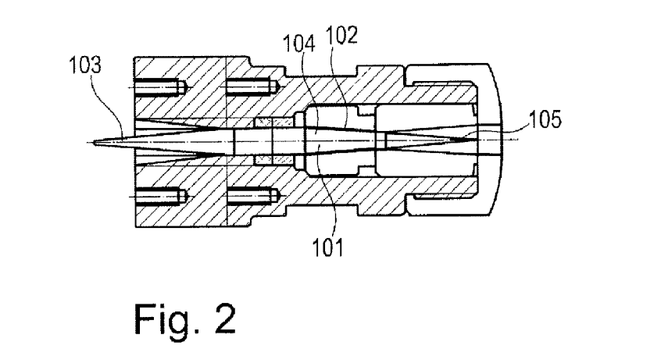
FIG. 2 shows a diagrammatic cross-sectional view of a partial region of an antenna according to a further exemplary embodiment of the present invention.

FIG. 2 shows a diagrammatic cross-sectional view of a partial region of an antenna according to a further exemplary embodiment of the invention. In this example the attenuation material 101 encases, at least in part, the rear conical region 105 of the separation element and a partial region of the cylindrical region 104 of the process separation device.

In contrast to the exemplary embodiment shown in FIG. 1, no sealing ring 116 is provided.

Figure 3:
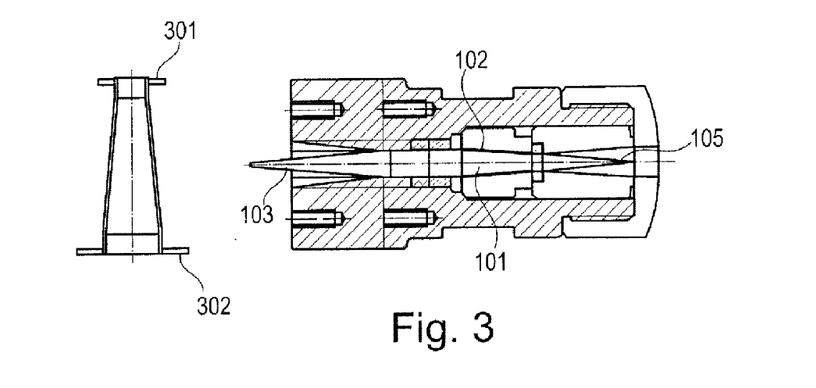
FIG. 3 shows a diagrammatic cross-sectional view of a partial region of an antenna according to a further exemplary embodiment of the present invention.

FIG. 3 shows a cross-sectional view of a partial region of a further exemplary embodiment of the antenna in which the attenuation element 102 encases only a middle region of the rear conical region 105 of the process separation device 101. Furthermore, FIG. 3 shows a cross-sectional view of the sleeve with two collars 301, 302.

It should be noted that the exemplary embodiments of the present invention may be combined. For example, it is possible for the rear conical region 105 to be equipped (encased, coated) with attenuation material in some parts only. As an addition or an alternative to this, the front region 103 of the process separation device can also be equipped, encased or coated with the attenuation material, as can the middle, cylindrical region 104.

Furthermore, a collar 301, 302 on one end or on both ends of the sleeve can be provided. This collar may improve the attenuating characteristics and can help fix the component in the construction.

The collar 301, 302 is situated on one side or on both sides, in each case at the end of the sleeve. The sleeve may be jammed in or jammed under this collar in order to provide HF-proofness. This can improve the HF characteristics.

Figure 4:
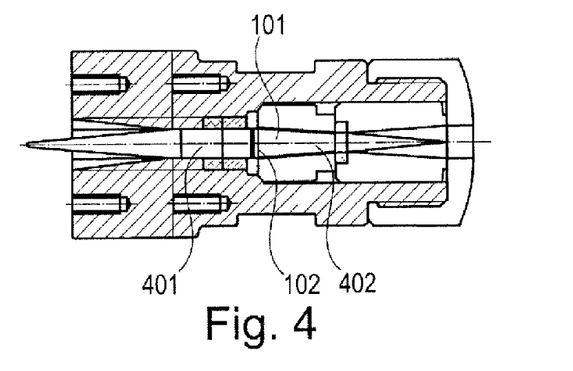
FIG. 4 shows a diagrammatic cross-sectional view of a partial region of an antenna according to a further exemplary embodiment of the present invention.

FIG. 4 shows a diagrammatic cross-sectional view of a partial region of an antenna according to a further exemplary embodiment of the present invention, which comprises a two-part ceramic component with a ferrite disc 102. In this exemplary embodiment the ceramic component is divided into a front part 401 and a rear part 402. Between the two ceramic parts 401, 402 there is a magnetic absorber 102 (attenuation element) that handles attenuation of the unwanted signal. The absorber 102 can, for example, be implemented with the use of a thin disc made of ferrite. However, it must be ensured that a ferrite material is used which at 400° C. still maintains its magnetic characteristics as fully as possible. To this effect, for example, lithium-titanium-zinc-ferrite, nickel-chromium-zinc-ferrite, or aluminium-holmium-ferrite are suitable. The use of other materials with ferritic characteristics may also be possible. A further possibility is the incorporation of ferrite powder in a high-temperature adhesive or cement.

Figure 5:
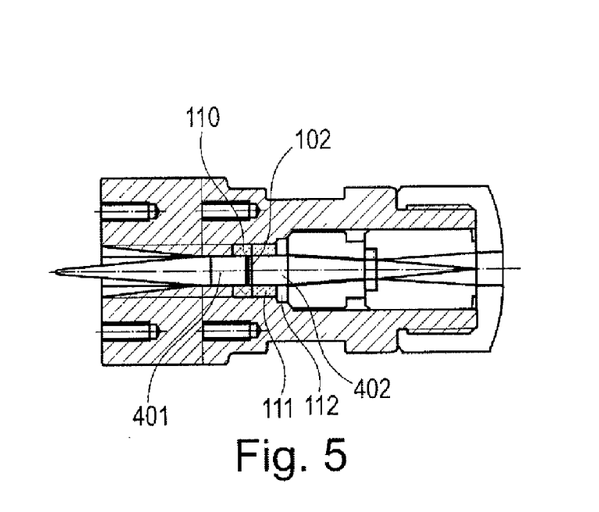
FIG. 5 shows a diagrammatic cross-sectional view of a partial region of an antenna according to a further exemplary embodiment of the present invention.

FIG. 5 shows a diagrammatic cross-sectional view of a partial region of the antenna according to a further exemplary embodiment of the present invention, in which the ferrite disc 102 is not arranged at the height of the ring 112 as is the case in the exemplary embodiment shown in FIG. 4, but instead further forward at the height of the ring 110. Other positions of the ferrite disc may also be possible, depending on the position of the separation point between the first region 401 and the second region 402 of the process separation device.

Figure 6:
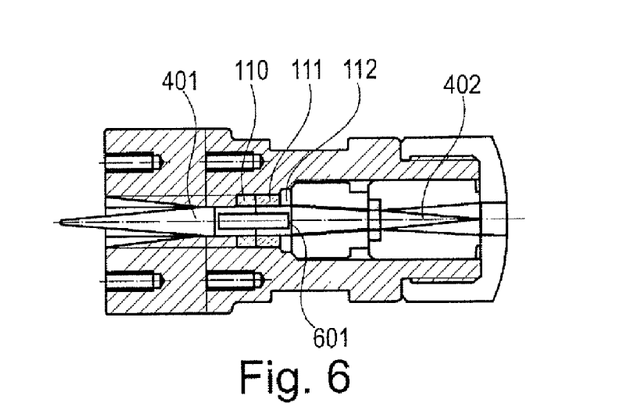
FIG. 6 shows a diagrammatic cross-sectional view of a partial region of an antenna according to a further exemplary embodiment of the present invention.

FIG. 6 shows a further exemplary embodiment of the antenna according to an exemplary embodiment of the invention, in which embodiment a two-part ceramic component 401, 402 is used, and in which embodiment the attenuation material is incorporated within the cylindrical region of the process separation device. In this exemplary embodiment one of the ceramic parts 401, 402 or both comprises/comprise a hole. This hole (or recess) is filled with an attenuation material 102. With corresponding dimensioning the same effect may be achieved as with the other exemplary embodiments, namely a reduction in the unwanted ringing.

The diameter is, for example, 2.0 mm, 2.5 mm or 3.0 mm. The length is, for example, 5 mm or 10 mm. Smaller dimensions of the holes are also possible and provided.

For this exemplary embodiment it may also be possible to use a temperature-resistant attenuation material, e.g. the woven carbon fabric designated E-RAM-TCG.

Figure 7:
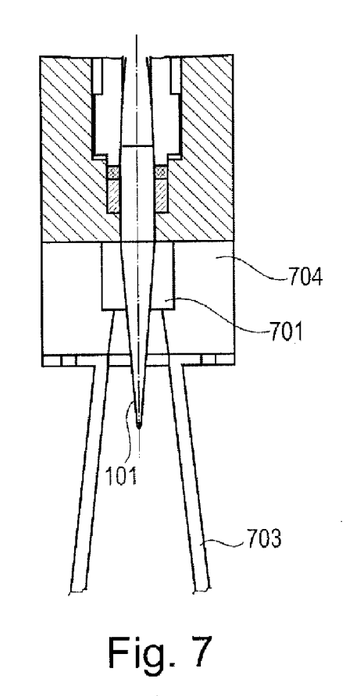
FIG. 7 shows a diagrammatic cross-sectional view of a partial region of an antenna according to a further exemplary embodiment of the present invention.

FIG. 7 shows a further exemplary embodiment of the antenna according to an exemplary embodiment of the invention. In this embodiment the unwanted ringing is attenuated in that, at the process separation device 101, attenuation material 701 is arranged in the interface between the ceramic material and the air on the side of the antenna horn 703. This is, for example, a high-temperature microwave-absorbent cement (e.g. C-RAM 325, manufactured by Cuming Microwave). The attenuation material used is, for example, the woven carbon fabric E-RAM-TCG, which in the case of FIG. 7 can be strengthened and protected with the cement or with a high-temperature adhesive (e.g. OMEGA BOND 600, manufactured by Omega) (see FIG. 8). As an alternative, the material can also be finely chopped and directly stirred into the high-temperature adhesive (e.g. OMEGA BOND 600, manufactured by Omega).

FIG. 7 shows the way the process separation device 101 at its front, conical region is enclosed at least in part by the cement 701.

Figure 8:
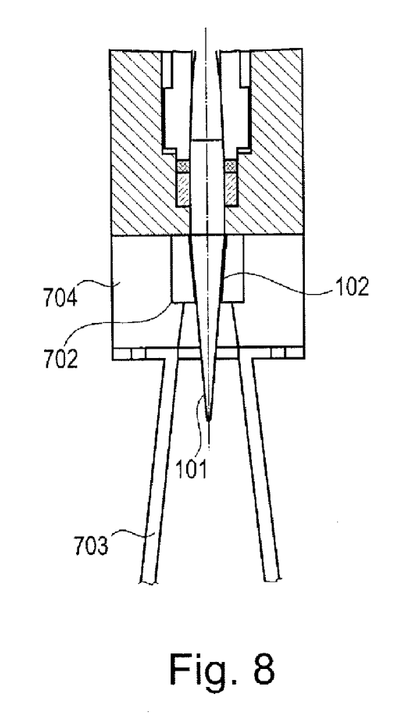
FIG. 8 shows a diagrammatic cross-sectional view of a partial region of an antenna according to a further exemplary embodiment of the present invention.

FIG. 8 shows the way the process separation device 101 at its front, conical region is enclosed at least in part by the attenuation material 102. The attenuation material 102 is then strengthened and protected by the high-temperature adhesive 702 or by a cement 702.

As shown in FIGS. 7 and 8 the cement 701 (FIG. 7) or the high-temperature adhesive or cement 702 (FIG. 8) partly also protrude into the antenna body 704 so that in this way additional fastening of the process separation device 101 in the antenna body 704 may be provided.

Figure 9:
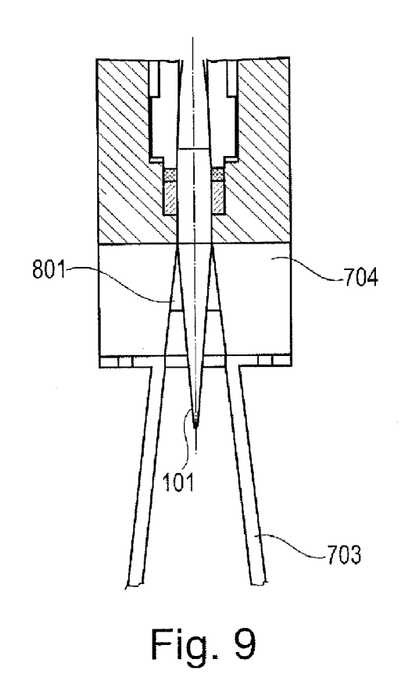
FIG. 9 shows a diagrammatic cross-sectional view of a partial region of an antenna according to a further exemplary embodiment of the present invention.

FIG. 9 shows the way the front, conical region of the process separation device 101 is at least in part enclosed by the high-temperature adhesive with integrated attenuation material 801.

As shown in FIG. 9, the high-temperature adhesive with the integrated attenuation material 801 can be injected into the space between the antenna body 704 and the process separation device 101. There is no need to provide an extra recess in the antenna body 704.

Figure 10:
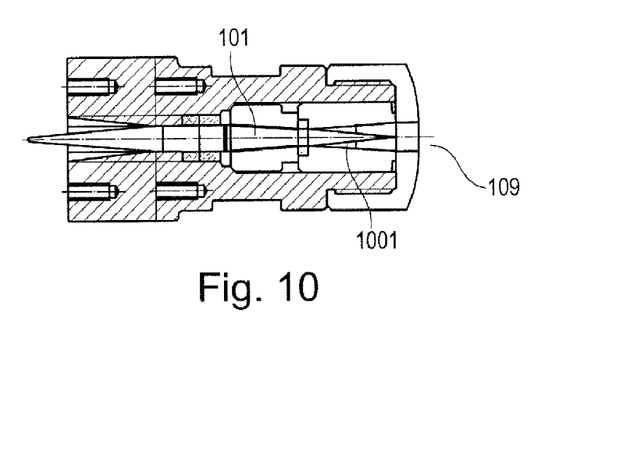
FIG. 10 shows a diagrammatic cross-sectional view of a partial region of an antenna according to a further exemplary embodiment of the present invention.

FIG. 10 shows a diagrammatic cross-sectional view of a partial region of an antenna according to a further exemplary embodiment of the present invention, in which embodiment the attenuation material 1001 is arranged in the rear transition region between the antenna cone (ceramic material) 105 and the air or the hollow conductor 109. The materials used correspond to those used in relation to FIGS. 7 to 9. For example attenuating cement or high-temperature adhesive with attenuation material may be used.

Figure 11:
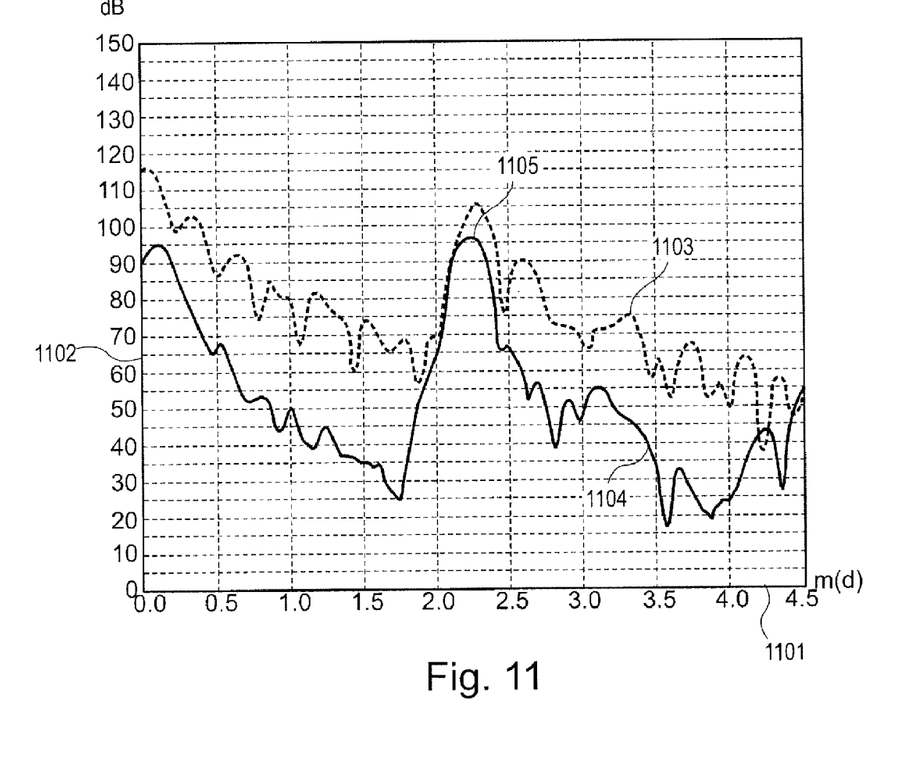
FIG. 11 shows the envelope of a ceramic antenna system according to the state of the art, and the envelope of a ceramic antenna system according to an exemplary embodiment of the present invention.

FIG. 11 shows two measuring curves 1103, 1104. These are the generating curves of two ceramic antenna systems. The horizontal axis 1101 corresponds to the length of the measuring distance (distance between the antenna and the feed material surface) in metres; it ranges from 0 to 4.5 m. The vertical axis 1102 corresponds to the attenuation in decibels; it ranges from 0 to 150 dB.

The aforesaid measurement data relates to a laboratory experiment. The laboratory ceiling is used to simulate the feed material surface, from which the echo at approx. 2.15 m results.

The diagram shows that the curve 1104 of the antenna system with attenuation material, while comprising a somewhat attenuated wanted-echo amplitude 1105 (attenuation approximately 8 dB), also comprises antenna ringing that decays considerably more quickly in the region to the left in front of the wanted-echo amplitude (reduced by up to 40 dB) when compared to the measuring curve 1103 which relates to a ceramic antenna system without attenuation.

The measured curves have been obtained from an embodiment as shown in FIG. 2. The embodiments shown in FIGS. 1 and 3 return very similar results.

Figure 12:
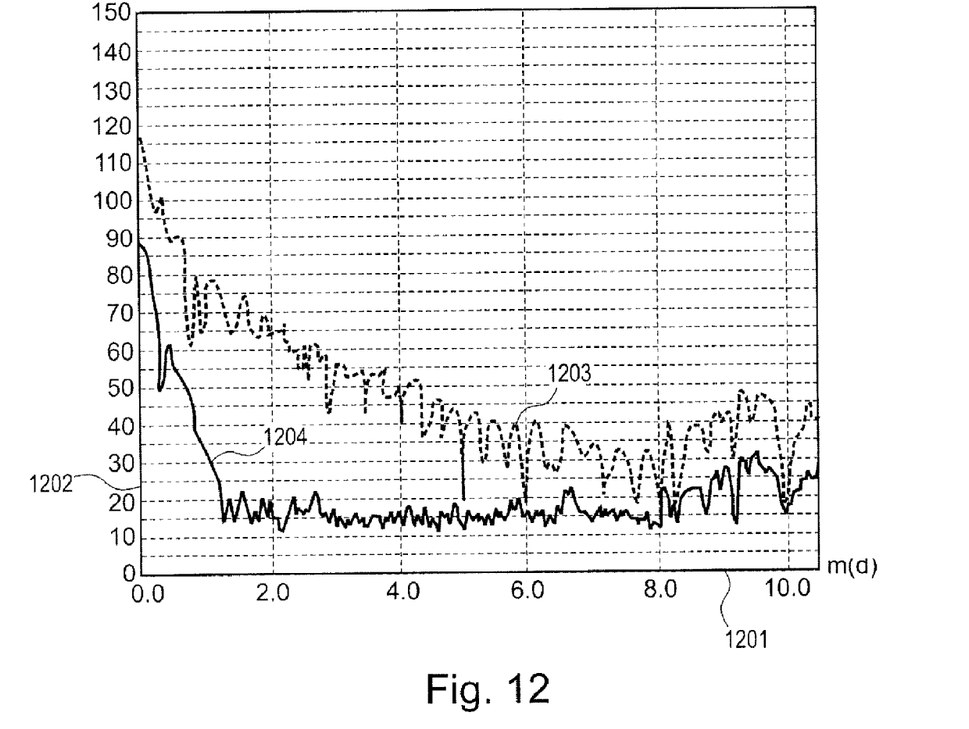
FIG. 12 shows the envelope of a ceramic antenna system according to the state of the art, and a second envelope of a ceramic antenna system according to an exemplary embodiment of the present invention.

FIG. 12 shows two further envelopes 1203, 1204 of two ceramic antenna systems. Curve 1203 depicts an envelope of a ceramic antenna system without attenuation. Curve 1204 depicts a ceramic antenna system with attenuation. The horizontal axis 1201 shows the distance to the feed material in metres, with said distance ranging from 0 to approximately 10 m. The vertical axis 1202 shows the attenuation in decibels, which ranges from 0 to 150 dB.

During the measurements shown in FIG. 12 the measuring signal is radiated into the free space, which is why no true echo can be detected.

The diagram clearly shows that antenna ringing of the antenna system with attenuation (curve 1204) attains the noise level already after approximately 1.5 m; while the antenna system without attenuation material (curve 1203) would do so as an estimate only after approximately 10 m.

Figure 13:
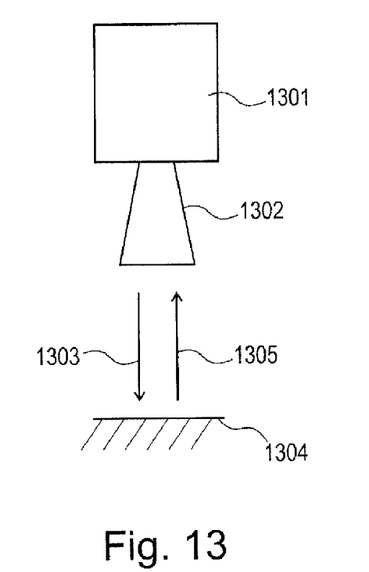
FIG. 13 shows a fill level radar according to an exemplary embodiment of the present invention.

FIG. 13 shows a fill level radar according to an exemplary embodiment of the present invention. The fill level radar comprises a housing 1301 with corresponding electronics and with an antenna 1302. The antenna radiates a measuring signal 1303 in the direction of the feed material surface 1304. The resulting reflected signal 1305 is detected by the antenna 1302 and is evaluated by the measuring electronics in the housing 1301, from which evaluation the fill level is then deduced.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. An antenna for a fill level radar for measuring the fill level in a tank, comprising:
    a separation device providing a seal between an interior of the tank and an exterior of the tank, the separation device being for at least one of high-temperature applications and high-pressure applications; and
    an attenuation element reducing an unwanted signal passing through the attenuation element, the unwanted signal being a component of a wanted measurement signal, the component being reflected within the antenna;
    wherein the attenuation element is one of (a) affixed to the separation device and (b) arranged in the separation device.

2. The antenna according to claim 1, wherein the separation device is designed on a ceramic material basis.

3. The antenna according to claim 1, wherein the separation device is composed of aluminium oxide.

4. The antenna according to claim 1, wherein the attenuation element at least partially encloses the separation device.

5. The antenna according to claim 1, wherein the attenuation element is an encasing of the separation device.

6. The antenna according to claim 1, wherein the separation device comprises a cylindrical region; and wherein the attenuation element is arranged in the cylindrical region of the separation device.

7. The antenna according to claim 1, wherein the separation device comprises a conical region; and wherein the attenuation element is arranged in the conical region.

8. The antenna according to claim 1, wherein the tank comprises an interior region; wherein the separation device comprises a first transition region to the atmosphere on a side of the separation device, which side points towards the interior region of the tank; and wherein the attenuation element is arranged in this transition region.

9. The antenna according to claim 1, wherein the tank comprises an exterior region; wherein the separation device comprises a second transition region to the atmosphere on a side of the separation device, which side points towards the exterior region of the tank; and wherein the attenuation element is arranged in this transition region.

10. The antenna according to claim 1, wherein the separation device comprises a first region and a second region that is divided off from the first region; and wherein the attenuation element is arranged between the two regions.

11. The antenna according to claim 1, wherein the separation device comprises a first region and a second region that is divided off from the first region; and wherein at least the first region comprises a hole in which the attenuation element is arranged.

12. The antenna according to claim 1, wherein the attenuation element is composed of a carbon material including carbon fibers as an attenuation material.

13. The antenna according to claim 12, wherein the carbon material is a textile fabric.

14. The antenna according to claim 12, wherein the carbon material comprises sections; and wherein the carbon material is reinforced or protected, at least in some of the sections, by treatment with a high-temperature adhesive or with a sodium silicate solution.

15. The antenna according to claim 12, wherein the carbon material comprises sections; and wherein the carbon material is reinforced or protected, at least in some of the sections, by treatment with a cement.

16. The antenna according to claim 1, wherein the attenuation element comprises a magnetic absorber as an attenuation material.

17. The antenna according to claim 16, wherein the magnetic absorber is a thin ferrite disc.

18. The antenna according to claim 16, wherein the magnetic absorber comprises at least one material selected from the group comprising lithium-titanium-zinc-ferrite, nickel-chromium-zinc-ferrite, and aluminium-holmium-ferrite.

19. The antenna according to claim 16, wherein the magnetic absorber comprises sections; and wherein the magnetic absorber is, at least in one section of the sections, one of strengthened and protected by treatment involving at least one of a high-temperature adhesive, a sodium silicate solution and a cement.

20. The antenna according to claim 1, wherein the antenna is designed for application at frequencies of one of 6.3 gigahertz and 26 gigahertz.

21. The antenna according to claim 1, wherein the antenna is designed for application at temperatures exceeding 400.degree. C.

22. A fill level radar, comprising:
an antenna including (a) a separation device providing a seal between an interior of the tank and an exterior of the tank, the separation device being for at least one of high-temperature applications and high-pressure applications and (b) an attenuation element reducing an unwanted signal passing through the antenna, the unwanted signal being a component of a wanted measurement signal, the component being reflected within the antenna, the attenuation element being one of (a) affixed to the separation device and (b) arranged in the separation device.

* * * * *